US010768930B2

(12) United States Patent
Sudhakar

(10) Patent No.: US 10,768,930 B2
(45) Date of Patent: Sep. 8, 2020

(54) PROCESSOR SUPPORTING ARITHMETIC INSTRUCTIONS WITH BRANCH ON OVERFLOW AND METHODS

(71) Applicant: MIPS Tech, LLC, Santa Clara, CA (US)

(72) Inventor: Ranganathan Sudhakar, Santa Clara, CA (US)

(73) Assignee: MIPS Tech, LLC, Santa Clara, CA (US)

( * ) Notice: Subject to any disclaimer, the term of this patent is extended or adjusted under 35 U.S.C. 154(b) by 642 days.

(21) Appl. No.: 14/612,104

(22) Filed: Feb. 2, 2015

(65) Prior Publication Data

US 2015/0227365 A1 Aug. 13, 2015

Related U.S. Application Data

(60) Provisional application No. 61/939,167, filed on Feb. 12, 2014.

(51) Int. Cl.
G06F 7/499 (2006.01)
G06F 9/302 (2018.01)
(Continued)

(52) U.S. Cl.
CPC .......... G06F 9/3001 (2013.01); G06F 7/4991 (2013.01); G06F 9/30043 (2013.01);
(Continued)

(58) Field of Classification Search
CPC .. G06F 9/3001; G06F 7/4991; G06F 9/30043; G06F 9/3013; G06F 5/14;
(Continued)

(56) References Cited

U.S. PATENT DOCUMENTS 4,370,709 A * 1/1983 Fosdick ............... G06F 9/3017
703/26
4,494,187 A * 1/1985 Simpson ............... G06F 9/32
365/203

(Continued)

FOREIGN PATENT DOCUMENTS

EP 0206655 A2 12/1986
EP 0847551 A1 * 6/1998 ........... G06F 7/5443
EP 1089166 A2 4/2001

OTHER PUBLICATIONS

Patterson, David A., and John L. Hennessy. Computer Organization and Design: The Hardware/software Interface. 3rd ed. Burlington, MA: Morgan Kaufmann, n.d. Print. 2005 (Pertient pp. 21, 63, 65, 80, 141, 172-173, 190, 294-301, 326).*

(Continued)

*Primary Examiner* — Daniel H Pan
(74) *Attorney, Agent, or Firm* — Adams Intellex, PLC

(57) ABSTRACT

A method provides for decoding, in a microprocessor, an instruction into data identifying a first register, a second register, an immediate value, and an opcode identifier. The opcode identifier is interpreted as indicating that an arithmetic operation is to be performed on the first register and the second register, and that the microprocessor is to perform a change of control operation in response to the addition of the first register and the second register causing overflow or underflow. The change of control operation is to a location in a program determined based on the immediate value. A processor can be provided with a decoder and other supporting circuitry to implement such method. Overflow/underflow can be checked on word boundaries of a double-word operation.

18 Claims, 10 Drawing Sheets

(51) Int. Cl.
*G06F 9/40* (2006.01)
*G06F 9/30* (2018.01)
*G06F 9/38* (2018.01)
*G06F 9/355* (2018.01)
*G06F 9/32* (2018.01)
*G06F 7/505* (2006.01)

(52) U.S. Cl.
CPC ...... *G06F 9/30145* (2013.01); *G06F 9/30167* (2013.01); *G06F 9/322* (2013.01); *G06F 9/3557* (2013.01); *G06F 9/3861* (2013.01); *G06F 7/505* (2013.01); *G06F 2207/3828* (2013.01)

(58) Field of Classification Search
CPC ............... G06F 7/78; G06F 12/0684; G06F 2207/3828; G06F 9/30145; G06F 9/30167; G06F 9/322; G06F 9/3557; G06F 7/483; G06F 9/3861; G06F 7/505; G06F 7/49921
USPC .............. 712/234, 221, 223; 708/498, 552
See application file for complete search history.

(56) References Cited

U.S. PATENT DOCUMENTS

| | | | | |
|---|---|---|---|---|
| 4,811,211 | A | | 3/1989 | Sandman et al. |
| 5,440,702 | A | * | 8/1995 | Brewer ............... G06F 7/57 712/223 |
| 5,721,857 | A | * | 2/1998 | Glew ............... G06F 9/3861 712/23 |
| 6,151,616 | A | * | 11/2000 | Mahurin ............... G06F 7/53 708/552 |
| 6,988,121 | B1 | * | 1/2006 | Tremblay ............... G06F 9/3001 708/670 |
| 7,725,522 | B2 | * | 5/2010 | Sadafale ............... G06F 7/523 708/625 |
| 2005/0060359 | A1 | * | 3/2005 | Schulte ............... G06F 7/507 708/495 |
| 2015/0178076 | A1 | * | 6/2015 | Sudhakar ............... G06F 9/30098 712/210 |

OTHER PUBLICATIONS

Price, Charles. MIPS IV Instruction Set. 3.2rd ed. N.p.: n.p., 1995. Print. (Pertinent pp. A-6 and A-53).*

* cited by examiner

FIG. 1A
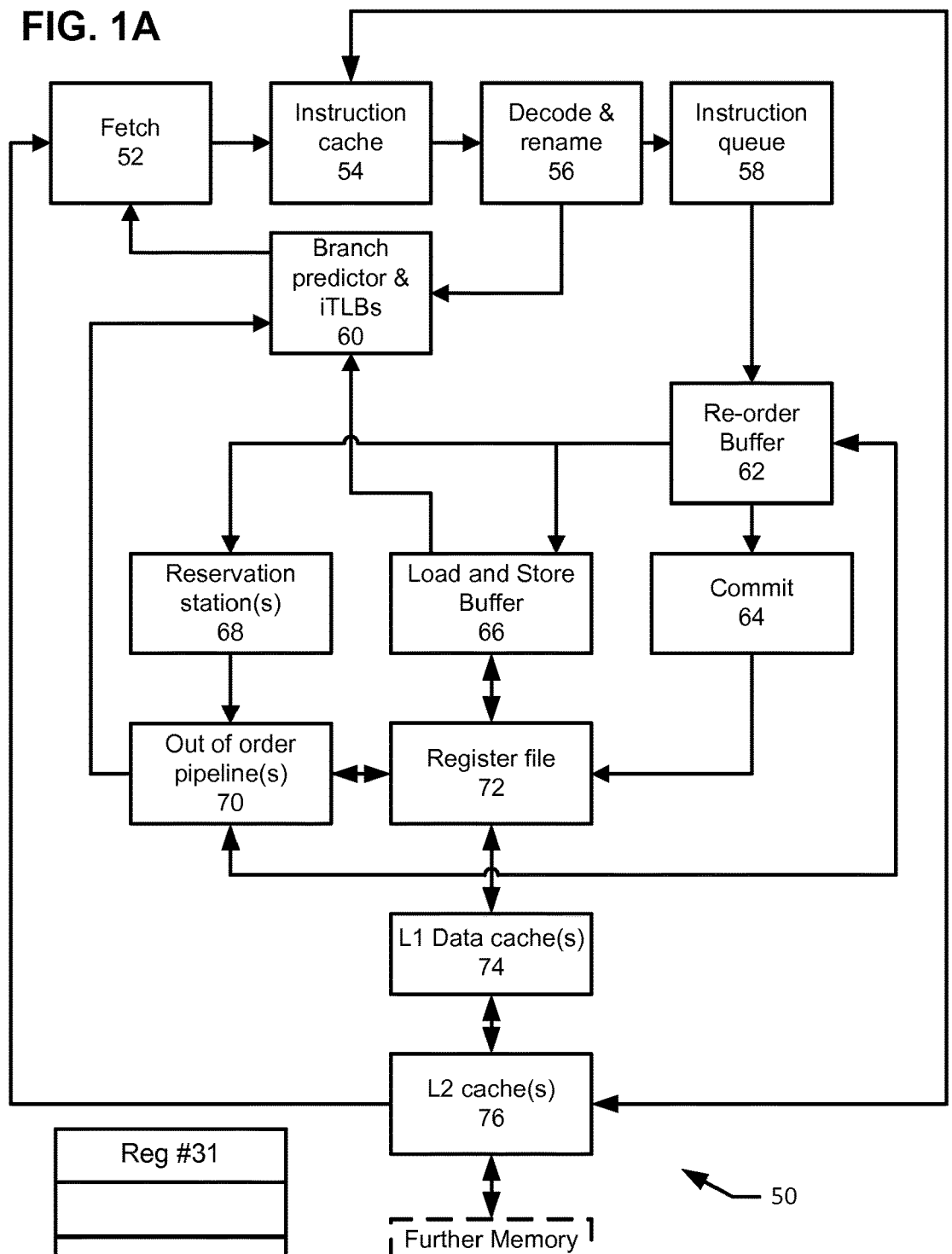
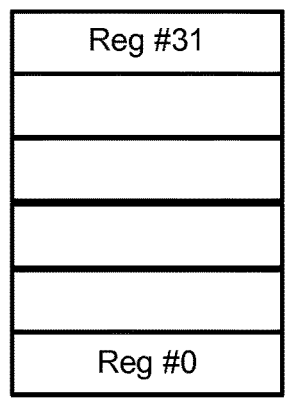
FIG. 1B

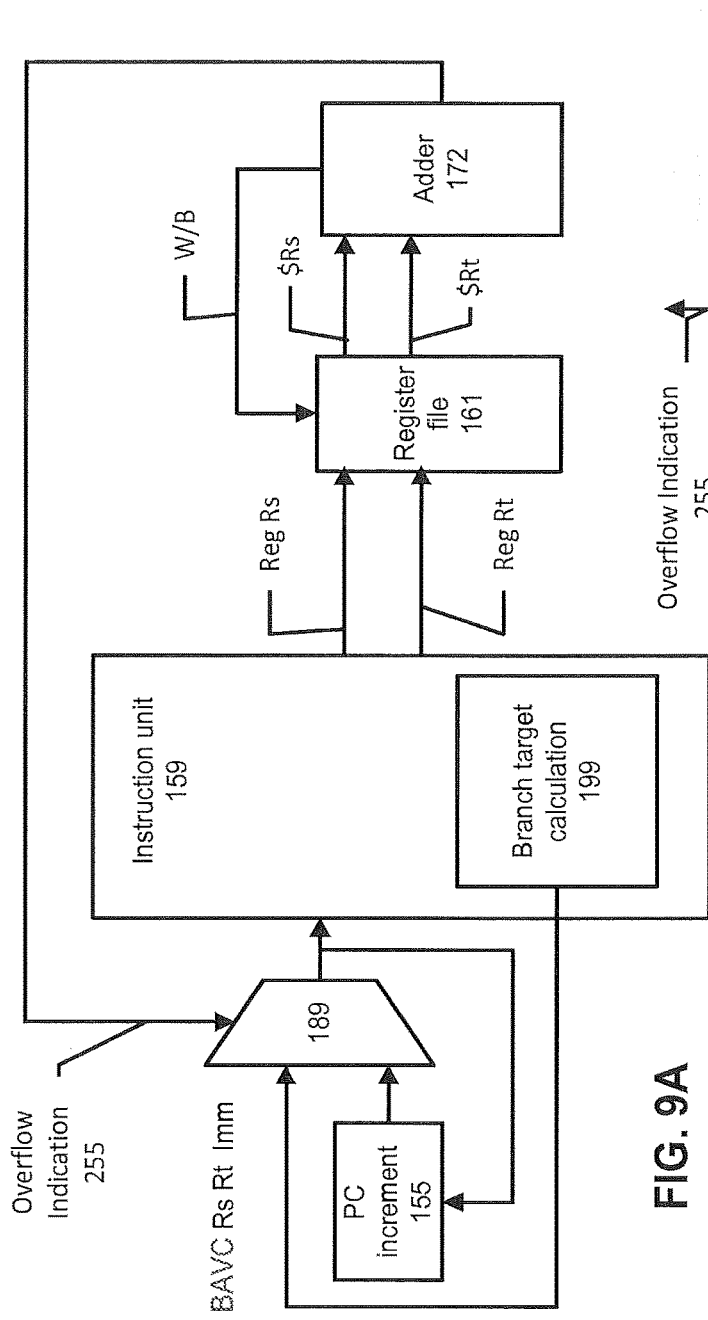
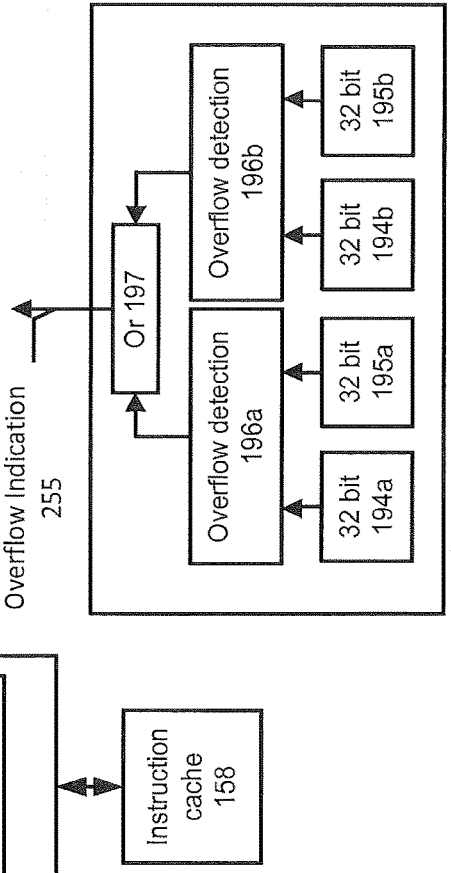
FIG. 9A
FIG. 9B

PROCESSOR SUPPORTING ARITHMETIC INSTRUCTIONS WITH BRANCH ON OVERFLOW AND METHODS

CROSS REFERENCE TO RELATED APPLICATIONS

This application claims priority from U.S. Provisional App. No. 61/939,167, filed on Feb. 12, 2014, which is incorporated by reference herein for all purposes.

BACKGROUND

Field

In one aspect, the following relates to microprocessor architecture, and in a more particular aspect, to microarchitectural implementations of disclosed processor architectural features.

Related Art

An architecture of a microprocessor pertains to a set of instructions that can be handled by the microprocessor, and what these instructions cause the microprocessor to do. Architectures of microprocessors can be categorized according to a variety of characteristics. One major characteristic is whether the instruction set is considered "complex" or of "reduced complexity". Traditionally, the terms Complex Instruction Set Computer (CISC) and Reduced Instruction Set Computer (RISC) respectively were used to refer to such architectures. Now, many modern processor architectures have characteristics that were traditionally associated with only CISC or RISC architectures. In practicality, a major distinction of meaning between RISC and CISC architecture is whether arithmetic instructions perform memory operations.

A RISC instruction set may require that all instructions be exactly the same number of bits (e.g., 32 bits). Also, these bits maybe required to be allocated accordingly to a limited set of formats. For example, all operation codes of each instruction may be required to be the same number of bits (e.g., 6). This implies that up to 2^6 (64) unique instructions could be provided in such an architecture. In some cases, a main operation code may specify a type of instruction, and some number of bits may be used as a function identifier, which distinguishes between different variants of such instruction (e.g., all addition instructions may have the same 6-digit main operation code identifier, but each different type of add instruction, such as an add that ignores overflow and an add that traps on overflow).

Remaining bits (aside from the "operation code" bits) can be allocated according to identifying source operands, a destination of a result, or constants to be used during execution of the operation identified by the "operation code" bits). For example, an arithmetic operation may use 6 bits for an operation code, another 6 bits for a function code (collectively the "operation code" bits herein), and then identify one destination and two source registers using 5 bits each. Even though a RISC architecture may require that all instructions be the same length, not every instruction may require all bits to be populated, although all instruction still use a minimum of 32 bits of storage.

SUMMARY

An aspect of the disclosure relates to a processor comprising an execution unit comprising an Arithmetic and Logic Unit (ALU) that is configured to accept at least two inputs, to perform an arithmetic operation on the accepted inputs and to generate an indication of overflow or underflow, which indicates whether the arithmetic operation resulted in overflow or underflow. An instruction unit is configured to receive the indication and to branch to a location in a program being executed, in response to the indication indicating that the arithmetic operation resulted in overflow or underflow. In the following, the term "overflow" will be used to describe both overflow and underflow, where underflow is a "negative" overflow, i.e., resulting in a negative number that can't be represented.

A program counter register holds a current value of a program counter. The instruction unit can be further configured to determine a subsequent instruction to execute either from the current value of the program counter or by a calculated branch target address, in response to the indication indicating either that the arithmetic operation did or did not result in overflow (overflow including underflow "negative overflow").

The instruction unit can be configured to decode the instruction to identify a first register holding one of two inputs and a second register holding the other of the two inputs, and an immediate. The execution unit can be configured to perform a double-word sized addition, and to check for overflow at word-sized boundaries.

The execution unit can be further configured to be controlled to subtract one of the at least two inputs from another of the at least two inputs and to generate an underflow indication, which indicates whether the subtraction resulted in underflow, and the instruction unit is further configured to receive the underflow indication and to branch to a location in a program being executed that is calculated based on a value supplied in an instruction that specified the at least two inputs, in response to the underflow indication indicating that the subtraction resulted in underflow.

An aspect of the disclosure pertains to a method of instruction-controlled execution in a microprocessor, which comprises decoding, in the microprocessor, an instruction into data identifying a first register, a second register, an immediate value, and an opcode identifier. The method also includes interpreting the opcode identifier as indicating that an arithmetic operation is to be performed on the first register and the second register, and that the microprocessor is to perform a change of control operation in response to the addition of the first register and the second register causing overflow or underflow. The change of control operation can be to a location in a program determined based on the immediate value.

The method of instruction-controlled execution set forth above may also comprise performing the arithmetic operation, generating a signal indicating whether or not the arithmetic operation overflowed or underflowed, and responsive to the signal indicating overflow or underflow, updating a program counter to the location in the program.

The arithmetic operation can be addition, and in such situation the signal indicates whether or not the addition overflowed. The arithmetic operation can be subtraction, and the signal indicates whether or not the subtraction underflowed in such circumstance.

The method may further comprise calculating a branch target address based on the immediate and a current program counter value, or based on stored data, and using the calculated branch target address to update the program counter, responsive to underflow or overflow.

An aspect of the disclosure pertains to a method of processing machine executable instructions in a processor. The method provides for accessing data representing an instruction to be executed in the processor. The instruction is decoded to determine a reference to a register in a set of architectural registers to which access by code executing under user-mode privilege is restricted. If the instruction is associated with user-mode privilege level (e.g., that the code is executing in a user-mode or a non-privileged mode), then the reference to the register is interpreted as a reference to a register storing a program counter value and then method provide performs an operation specified by the instruction, using the program counter value. An example of such an operation is a branch relative to the program counter. Program code can be provided on a non-transitory medium that encodes program counter relative instructions by referencing a pre-determined register that would otherwise not be accessible to user-mode code. A further aspect of the disclosure is a processor with an instruction decoder that decodes instructions according to an implementation of the method described above.

BRIEF DESCRIPTION OF THE DRAWING

FIGS. 1A and 1B depict block diagrams pertaining to an example processor which can implement aspects of the disclosure;

FIGS. 9A and 9B depict a functional block diagrams for a processor implementing an add with branch on overflow instruction according to the disclosure;

DETAILED DESCRIPTION

Figure 2:
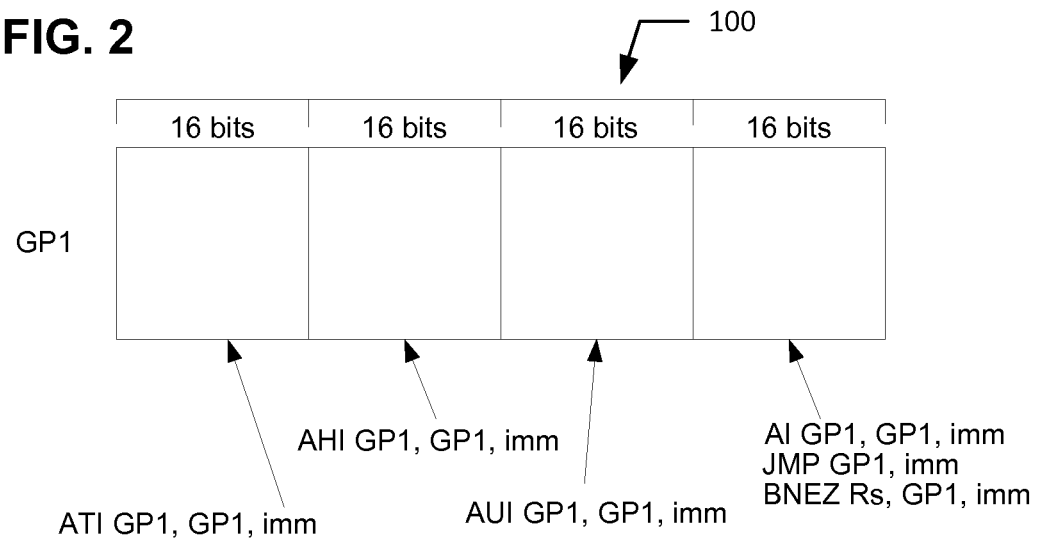
FIG. 2 depicts an example of forming a 64-bit immediate using a sequence of instructions according to the disclosure.

The following disclosure uses examples principally pertaining to a RISC instruction set, and more particularly, to aspects of a MIPS processor architecture. Using such examples does not restrict the applicability of the disclosure to other processor architectures, and implementations thereof.

As introduced above, each instruction supported by a processor architecture has a portion of bits available to identify the exact operation to be performed for a given instruction. This number of bits is limited by a variety of practical considerations. One consideration is instruction length; a 32 bit instruction requires less storage than a 64 bit instruction. A number of bits required to identify source and destination registers depends on a number of architectural registers to be supported, which may affect how many bits are left for other purposes. A complexity of logic required to decode instructions also may be a factor; for example, a selection f which operation codes identify which instructions can influence complexity and overall efficiency of decode logic.

Aside from the technical concerns, processor architecture design also is influenced by other considerations. One main consideration is support for prior generations of a given processor architecture. Requiring code to be recompiled for a new generation of an existing processor architecture can hinder customer adoption and requires more supporting infrastructure than a processor architecture that maintains backwards compatibility. In order to maintain backwards compatibility, the new processor architecture should execute the same operations for a given object code as the prior generation. This implies that the existing operation codes (i.e., the operation codes and other functional switches or modifiers) cannot be changed in the new processor architecture. As computation needs change over time, it may be desirable to add instructions to support certain capabilities; such as integer and floating point Single Instruction Multiple Data (SIMD) instructions for media processing acceleration.

FIG. 1A depicts an example diagram of functional elements of a processor 50 that can implement aspects of the disclosure. The example elements of processor 50 will be introduced first, and then addressed in more detail, as appropriate. This example is of a processor that is capable of out of order execution; however, disclosed aspects can be used in an in-order processor implementation. As such, FIG. 1A depicts functional elements of a microarchitectural implementation of the disclosure, but other implementations are possible. Also, different processor architectures can implement aspects of the disclosure. The names given to some of the functional elements depicted in FIG. 1A may be different among existing processor architectures, but those of ordinary skill would understand from this disclosure how to implement the disclosure on different processor architectures, including those architectures based on pre-existing architectures and even on a completely new architecture.

Processor 50 includes a fetch unit 52, which is coupled with an instruction cache 54. Instruction cache 54 is coupled with a decode and rename unit 56. Decode and rename unit 56 is coupled with an instruction queue 58 and also with a branch predictor that includes an instruction Translation Lookaside Buffer (iTLB) 60. Instruction queue 58 is coupled with a ReOrder Buffer (ROB) 62 which is coupled with a commit unit 64. ROB 62 is coupled with reservation station(s) 68 and a Load/Store Buffer (LSB) 66. Reservation station(s) 68 are coupled with Out of Order (OO) execution pipeline(s) 70. Execution pipeline(s) 70 and LSB 66 each couple with a register file 72. Register file 72 couples with an L1 data cache(s) 74. L1 cache(s) 74 couple with L2 cache(s) 76. Processor 50 may also have access to further memory hierarchy elements 78. Fetch unit 52 obtains instructions from a memory (e.g., 12 cache 76, which can be a unified cache for data and instructions). Fetch unit 52 can receive directives from branch predictor 60 as to which instructions should be fetched.

Functional elements of processor 50 depicted in FIG. 1A may be sized and arranged differently in different implementations. For example, instruction fetch 52 may fetch 1, 2, 4, 8 or more instructions at a time. Decode and rename 56 may support different numbers of rename registers and queue 58 may support different maximum numbers of entries among implementations. ROB 62 may support different sizes of instruction windows, while reservation station(s) 68 may be able to hold different numbers of instructions waiting for operands and similarly LSB 66 may be able to support different numbers of outstanding reads and writes. Instruction cache 54 may employ different cache replacement algorithms and may employ multiple algorithms simultaneously, for different parts of the cache 54. Defining the capabilities of different microarchitecture elements involve a variety of tradeoffs beyond the scope of the present disclosure.

Implementations of processor 50 may be single threaded or support multiple threads. Implementations also may have Single Instruction Multiple Data (SIMD) execution units. Execution units may support integer operations, floating point operations or both. Additional functional units can be provided for different purposes. For example, encryption offload engines may be provided. FIG. 1A is provided to give context for aspects of the disclosure that follow and not by way of exclusion of any such additional functional elements.

Some portion or all of the elements of processor 50 may be located on a single semiconductor die. In some cases, memory hierarchy elements 78 may be located on another die, which is fabricated using a semiconductor process designed more specifically for the memory technology being used (e.g., DRAM). In some cases, some portion of DRAM may be located on the same die as the other elements and other portions on another die. This is a non-exhaustive enumeration of examples of design choices that can be made for a particular implementation of processor 50.

FIG. 1B depicts that register file 72 of processor 50 may include 32 registers. Each register may be identified by a binary code associated with that register. In a simple example, 00000b identifies Register 0, 11111b identifies Register 31, and registers in between are numbered accordingly. Processor 50 performs computation according to specific configuration information provided by a stream of instructions. These instructions are in a format specified by the architecture of the processor. An instruction may specify one or more source registers, and one or more destination registers for a given operation. The binary codes for the registers are used within the instructions to identify different registers. The registers that can be identified by instructions can be known as "architectural registers", which present a large portion, but not necessarily all, of the state of the machine available to executing code. Implementations of a particular processor architectural may support a larger number of physical registers. Having a larger number of physical registers allows speculative execution of instructions that refer to the same architectural registers. Register file 72 may have different numbers and kinds of ports in different implementations. For example, some implementations may supply two ports, while others may supply more. Some implementations may have designated read ports and write ports.

Instructions may have different formats. In some cases, an instruction may specify a category of operations using the 6-bit main operation code identifier, and then include a function code field that specifies the specific operation to be performed. For example, all addition operations may be identified by the same 6-bit main operation code identifier, but the function codes will vary. For example, one addition operation may trap on overflow while another addition does not. These can be identified using different function codes. In this disclosure, these different fields are collectively referred to as an "operation code identifier" (opcode identifier), and this term thus refers to the main opcode identifier alone, or with a corresponding function code, as would be appropriate in the particular context.

Binary data (machine code) loaded into decode and rename unit 56 can be interpreted according to the opcode identifier portion of each instruction. If instructions are all the same length, then binary data does not need to be parsed to determine instruction boundaries within a given set of data. However, various usages of the available bits in each instruction may vary. For example, some instructions may specify between one and three registers, and zero or more intermediates. Also, depending on the opcode, different functional elements may need to receive and process different portions of data pertaining to a given instruction. Further details concerning examples of how different types of instructions according to the disclosure can be processed follow. Scheduler logic within a processor implementing aspects of the disclosure can determine how resources available in the processor can be used to execute each instruction; such logic also may take into account resources required to complete execution of other instructions, such that instruction-level parallelism can be efficiently provided.

Instructions for Creating Large Arbitrary Values

Modern computing systems have vastly more memory compared to amounts of memory that were available when most RISC computing architectures were designed. For example, it is not unusual to find portable computers that have sixteen or more gigabytes of Random Access Memory (RAM), while higher performance computers may have 32, 64, 128, 256 or more gigabytes of RAM. In some computing systems, greater address ranges are supported using 64-bit addressing. However, even though more processor architectures support 64-bit addressing, instructions available for tasks related to memory access remain largely unchanged.

For example, if a program is intended to branch or jump from a current program counter to elsewhere, one approach to specify the target address, to which the branch or jump will go (more generally, a change in program counter), is to specify an immediate within the branch or jump instruction. However, a number of bits that can be used to represent the immediate within an instruction is limited. For example, in a RISC architecture in which all instructions are 32 bits, and a certain number of bits are allocated to operation code, to specify operands, etc., it may be the case that only 16 bits are available for the immediate, which allows 64 k different locations to be addressed. A number of bytes that can be addressed using 16 bits depends on a granularity with which memory is addressed. If memory is addressed in 4 byte increments, then a 16 bit immediate can address 256 kilobytes of memory space, and if memory is byte-addressable, then 64 kilobytes can be addressed by a 16-bit immediate. Some architectures may support word-alignment for immediates in the context of the program counter (i.e., if the program counter is word-aligned, then the immediate value specified in a branch may be word-aligned by the processor, rather than explicitly word-aligned by the immediate value itself). In the case of a branch or jump, this means that the change in program counter may be confined to this amount of addressable memory space. Some processor architectures may use some portion of a program counter in conjunction with an immediate specified in a jump instruction. Such addressability limitations may be inadequate for some situations.

Another technique is to provide a branch or jump instruction that refers to a register, and a processor formulates a target address based on a combination of a value in the register and the immediate value. However, in such a situation, an appropriate value needs to be made available in the register. For example, in a processor according to MIPS™ processor architecture, a load upper immediate instruction (LUI) can be used to store a 16-bit immediate in an upper part of a 32-bit destination register, and then a logical OR immediate (ORI) with the same destination register and a 16-bit immediate causes the lower 16-bits of the destination register to be set. Here, a distinction is made between a pseudoinstruction (i.e., a load immediate), which is decomposed for execution (e.g., into LUI and ORI) by an assembler for actual execution.

Still further, current processor architectures do not support directly addressing sections of a 64-bit register to load immediate values in those sections. For example, a 64-bit register has four 16 bit sections. Current processor architectures do not support directly loading immediate values in those 16-bit sections. Rather, a 64 bit immediate value could be constructed by using an LUI, followed by an ORI, which forms a 32-bit immediate that is destined for an upper half of the 64-bit register, which is stored in one general purpose register. Then, a shift instruction shifts these 32-bits into the upper half of the 64-bit register. Then, the same instructions are executed to provide the intended lower 32 bits in a different general purpose register. The two general purpose registers can then be added to produce the final 64 bit value. Then, that register value can be used in a branch or jump instruction. Thus, branching or jumping to an arbitrary 64 bit address requires 7 instructions (LUI, ORI, SL, LUI, ORI, ADD, JMP/Branch.)

An order of operations also is important in such a sequence of instructions, because the load upper immediate instruction (LUI) is destructive to the existing contents of the register identified in the instruction, while the ORI cannot be effective unless it is preceded by the LUI.

The following presents a set of instructions that can be used in program code to more directly control large (64 bits or more) register contents. These instructions also can be used in the context of instructions that change program control locations.

| Instruction Name | Instruction format | Short Description of Action(s) taken by processor |
| --- | --- | --- |
| AUI rt, rs, imm16 | Opcode rs rt imm16 | $rt := $rs + sign_extend(imm16 << 16) |
| AHI rt, rt, imm16 | Opcode rt imm16 | $rt := $rt + sign_extend(imm16 << 32) |
| ATI rt, rt, imm16 | Opcode rt imm16 | $rt := $rt + sign extend(imm16 << 48) |

FIG. 2 depicts a diagram of how the above instructions may affect contents of a 64-bit register 100. FIG. 2 depicts an example where a physical register 100 may be allocated as a destination for the instructions that specify an architectural register called General Purpose (GP) register 1 (GP1). In other words, the example of FIG. 2 shows that a register allocation function or scheduler has assigned register 100 to the "rt" in the AHI, ATI, AUI instructions enumerated above. FIG. 2 depicts that ATI GP1, GP1, imm, adds the specified immediate value, shifted to the top quartile of register 100, to the current value in register 100 and stores that sum in register 100. AHI GP1, GP1, imm performs such addition and storage, for the specified immediate (imm) shifted into the third quartile of register 100. AUI GP1, GP1, imm performs such addition and storage for the specified immediate (imm) shifted into the second quartile of register 100. The example of FIG. 2 shows that a variety of instructions affecting the lowest 16 bits of register 100 can be provided. For example, an Add Immediate GP1, GP1, imm can be provided that will perform the same addition and storage, for the immediate value, without being shifted. Another example is a Jump instruction (JMP) that specifies GP1 and an immediate. The Jump instruction adds the specified immediate to the value of GP1 and then jumps to a program counter determined based on the resultant value of the addition. Another example is a conditional branch instruction, which has a condition that does not require specifying a separate value (e.g., such as requiring two registers to be compared). An example of such a conditional branch is Branch Not Equal to Zero (BNEZ) that accepts a register, with a value to be compared with zero. Such BNEZ may also accept a second register identifier and an immediate. The immediate is added to the contents of the second identified register in calculating a branch target if the branch is taken.

Figure 3:
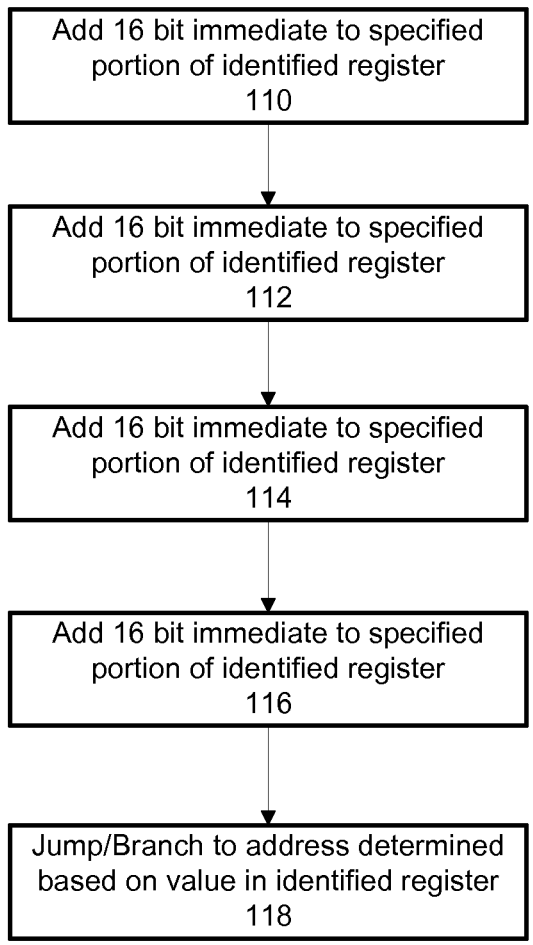
FIG. 3 depicts an example process for forming a 64-bit immediate using a sequence of instructions according to the disclosure.

The contents of the register used to determine a final target address of the jump or branch can be setup by a sequence of ATI, AHI, and AUI instructions preceding the branch or jump instruction. Thus, aspects of the disclosure include instruction sequences achieving this effect. FIG. 3 presents an example of four additions (110, 112, 114, and 116), each addition causing a respective 16-bit immediate to be added to a respective different portion of an identified register. In this example, the group of four additions may have one of each of an ATI, AHI, AUI, and AI instruction, since executing these instructions is not destructive to the contents of the register not addressed by that particular addition. Then, at 118, a branch or jump or other change of control can be effected based on the contents of that register. Of course, instructions that change a program counter are one example of instructions that can be used in conjunction with these ATI, AHI, AUI and AI instructions, but are not exclusive.

Figure 4:
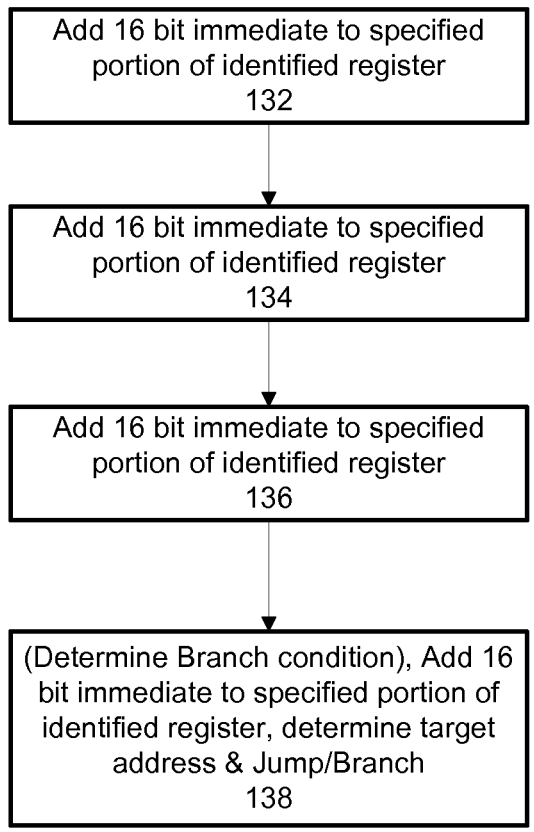
FIG. 4 depicts an example process for forming a 64-bit immediate using a sequence of instructions according to the disclosure.

FIG. 4 depicts a different implementation, in which three additions, addressing the upper three fourths of the same register establish a desired arbitrary value in the upper three-fourths of that register (actions 132, 134, 136), and then a final instruction (action 138) can perform work in accordance with the instruction type (e.g., a conditional branch, as described above), and use the contents of the register and optionally a specified immediate value to determine a target address, and then change control as necessary. Thus, FIG. 4 presents a sequence of four instructions that allow a change of control to be effected to a location within the addressability of 64 bits. Most processor architectures would allocate these 64 bits to 32 bits on either side of a given program counter. This capability is in contrast to the example current approach that requires seven instructions to perform this work.

Instructions that use this methodology also can include instructions that link, such as a jump and link, where a value related to a current program counter (e.g., an incremented program counter) is stored in a link register, and used to return after completing a given routine.

| Instruction Name | Instruction format | Short Description of Action(s) taken by processor |
| --- | --- | --- |
| JIC disp16(rt)) | JIC rt disp16 | Jump to $rt + sign_extend(disp16) |
| JIALC disp16(rt)) | JIALC rt disp16 | Jump to $rt + sign extend(disp16) and link |

PC Relative Adds

Another category of instructions that may be implemented relates to producing a value based on a current program counter and an immediate value, which is then stored in a specified destination register. The value in such destination register can then be used as a basis for a branch or jump instruction. This category of instructions may be used for dynamic linking, to allow a broader range of addresses to be reachable, while using a program counter reference, as opposed to a memory location at which a given segment of code was located in memory. These instructions may be useful in transforming source code into an intermediate code format (e.g., a "byte code" format) that can be translated or interpreted, such as by a Just In Time (JIT) process, such as in the context of a virtual machine, such as a Java® virtual machine or a derivative, such as virtual machine for Android O. Any such example code generation aspect can be used in an implementation of the disclosure. Additionally, these examples can be used by those of ordinary skill in the art to understand how to apply these examples to different circumstances.

| | | |
|---|---|---|
| AUIPA rs, imm16 | Opcode rs imm16 | $rs := -0xFFFF & ($pc + sign extend(imm16 << 16)) Add sign-extended 16 bit immediate, shifted by 16 bits, align to PC and store result in Rs. |
| AUIP rs, imm16 | Opcode rs imm16 | $rs := ($pc + sign extend (imm16 << 16)) Add sign-extended 16 bit immediate, shifted by 16 bits, to PC value and store result in Rs. |
| ADDIUP rs, pc, imm19 | Opcode rs imm19 | $rs := $pc + sign_extend (imm19 « 2) Add sign-extended 19-bit immediate, shifted by 2 bits (word align), to PC value and store result in Rs. |

Figure 5:
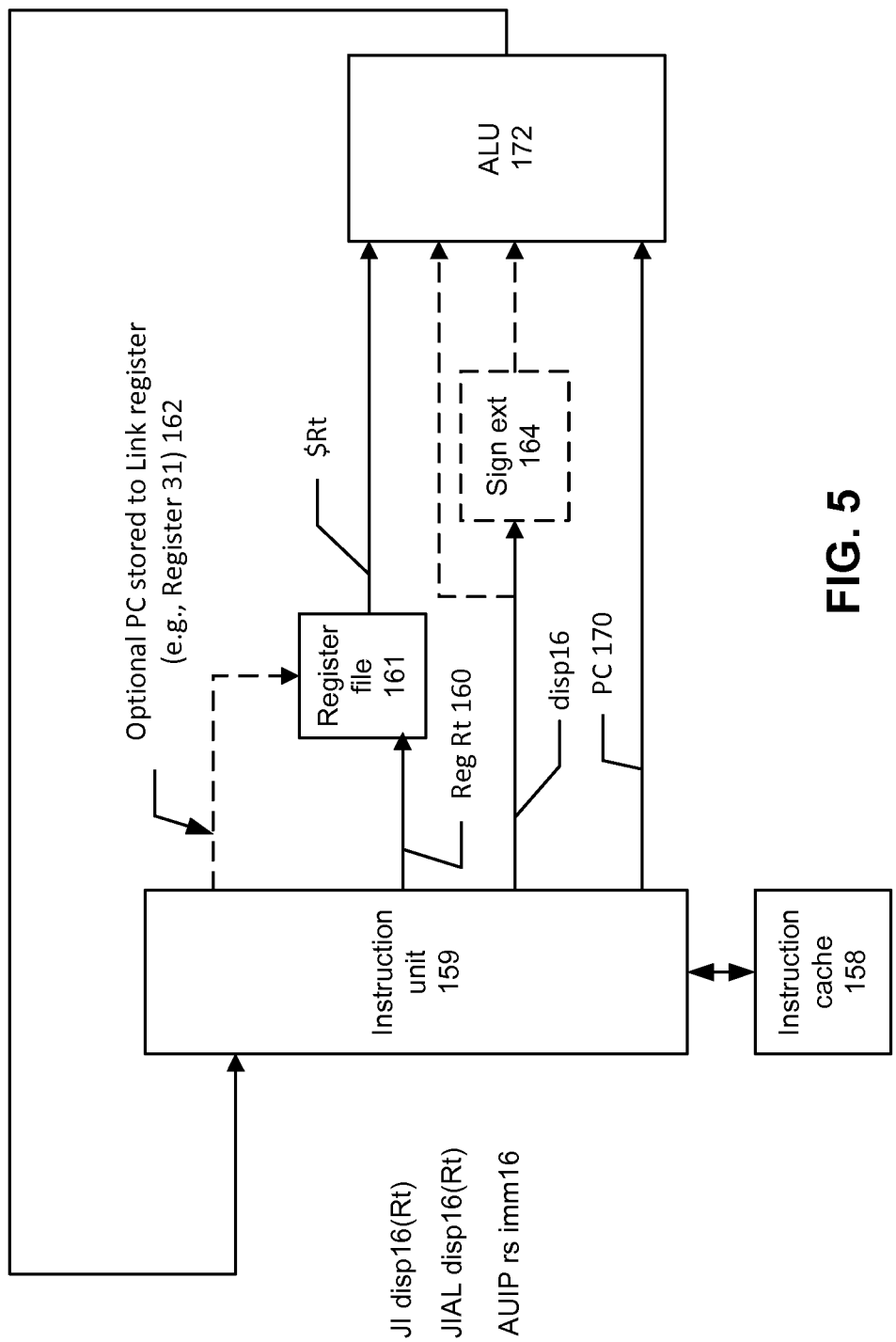
FIG. 5 depicts a functional block diagram for a processor implementing instructions according to the disclosure.

FIG. 5 depicts an example block diagram of how a processor can implement the example instructions set forth above. FIG. 5 depicts an instruction unit 159 (with an instruction cache 158) that performs an instruction decoding according to a particular instruction encoding approach determined according to the architecture of the processor. Instruction unit 159 provides control data to appropriate functional units, in order to carry out the tasks needed to perform each instruction. Some of the functional units in FIG. 5 may not be used for all instruction types.

For example, in the case of a jump displaced immediate, based on a contents of a register Rt 160, a register file 161 may receive an indicator to retrieve contents of Rt (contents of a register identified by a preceding $, e.g., $Rt indicates the value stored in Rt). An Arithmetic Logic Unit (ALU) 172 receives $Rt. A program counter value 170 is also provided to ALU 172. A specified immediate is provided to a sign extender 164, which extends a sign of the immediate to a width of Rt. That value is provided to ALU 172, without shifting. ALU 172 then adds the sign extended immediate to $Rt and provides that value to instruction unit 159, which then will begin execution at a program counter based on that value. Where the instruction is intended to link, a program counter value 162 can be stored in a link register (this storage may be accomplished by a load/store unit, not depicted in FIG. 5).

A shifter 166 is used for those instructions that require an immediate to be shifted into an appropriate relative position in a register (e.g., for the ATI, AHI, and AUI instructions). Shifter 166 may accept an input directly from the instruction (i.e., an unmodified immediate), or a sign-extended immediate. Where a particular instruction requires using a shifted value, ALU 172 would receive that immediate value from shifter 166, instead of coming from sign extender 164, or as an unmodified immediate specified directly in the instruction.

For example, an AUIP uses sign extender 164 for a specified 16-bit immediate, which is shifted by shifter 166, and that value is added to the PC 170 by ALU 172, and the result is stored in a specified register (Rs in FIG. 5). Thus, AUIP presents an example where a 16-bit immediate can be specified for a PC-relative addition. ADDIUP presents an example in which a larger immediate value can be specified (19 bits for example), which is sign-extended, shifted by 2 bits, then added to the PC, and that value then stored in Rs (in the example of FIG. 5). These two instructions thus depict examples of PC-relative operations, which can be used for implementing position-independent coding.

PC Relative Loads

Another category of instructions that can be used in position independent coding are instructions that load a value into a specified register, where the value is retrieved from a memory address determined from the program counter and a displaced immediate specified by the instruction. The displaced immediate can be sign extended or zero extended. The loads can be single word, double word loads, for example. Other implementations may provide quad word loads. The following three example instructions show a combination of sign extension versus zero extension, single and double word load, based on a 19 bit immediate value, which is shifted by two bits, to calculate an address relative to the program counter.

| | | |
|---|---|---|
| LD rs, disp19(pc) | Opcode Rs disp19 | $rs := Doubleword load from $pc + sign extend(disp19 << 2) |
| LW rs, disp19(pc) | Opcode Rs disp19 | $rs := Sign-extend Word Load from $pc + sign extend(disp19 << 2) |
| LWU rs, disp19(pc) | Opcode Rs disp19 | $rs := Zero-extend Word Load from $pc + sign_extend(disp19 « 2) |

Figure 6:
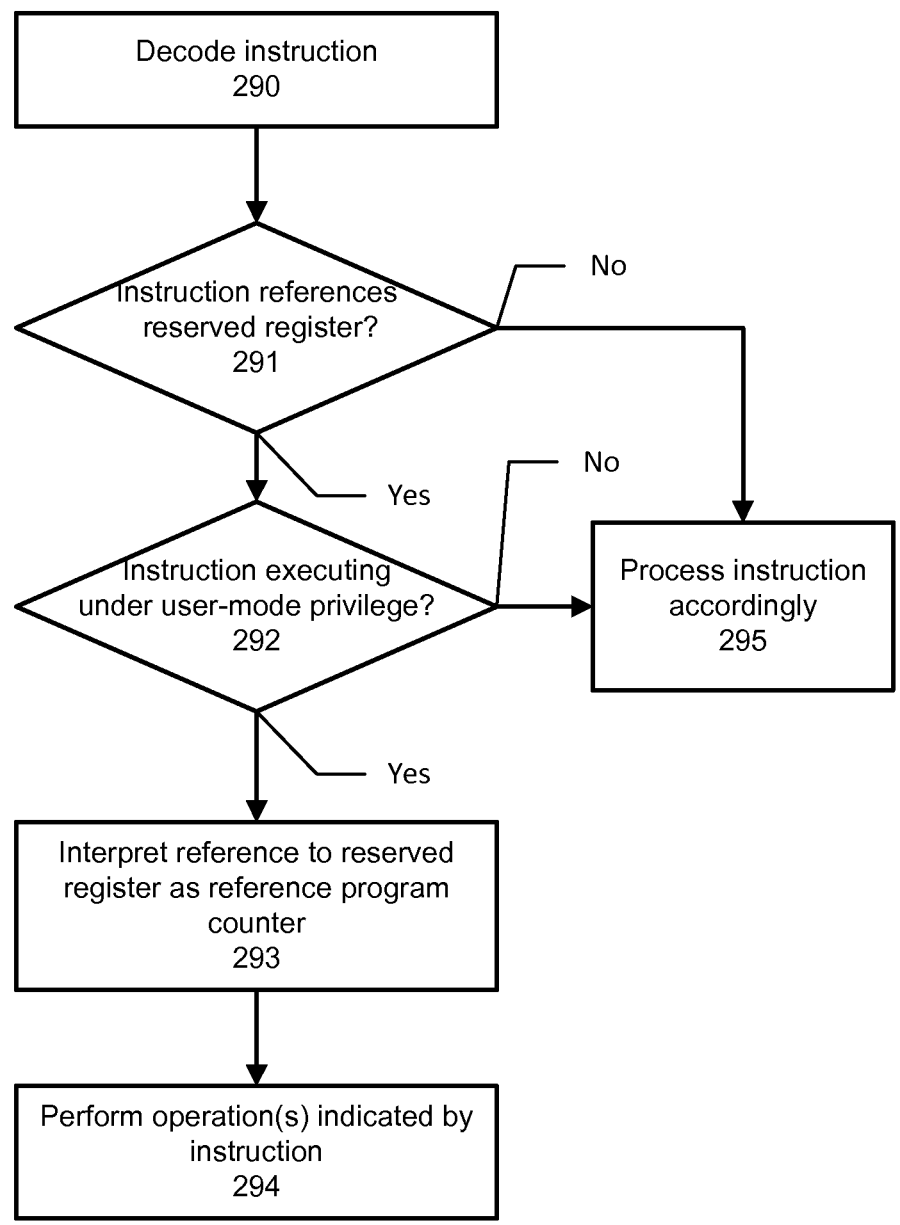
FIG. 6 depicts a process by which instructions can reference a program counter value using a register alias.

FIG. 6 depicts a process (actions 290, 291, 292, 293, 294, 295) for an example block diagram of how a processor can implement PC-relative loads, with respect to the example instructions set out above. Instruction unit 159 decodes each instruction and provides a register identifier to a load/store unit 175; this identified register will receive data retrieved from a memory (memory unit 177 representing a memory hierarchy from which such data can be retrieved). A displacement value (e.g., 19 bits in length) is provided to sign extender 164, which outputs to ALU 172, which also receives a PC value 170. The ALU adds the sign extended immediate to PC value 170 and then generates a load address 182. Load/store unit 175 then writes data 180 to Register Rs.

Different processor architectures may express aspects of these instructions according to an approach suitable to that architecture, and implementations of a given architecture may also have considerable variations. For example, a program counter may be stored in a register that is not directly readable or writable by user-mode code. For example, in current MIPS® processor architectures, instructions that execute under user-mode privilege may not directly read or write a program counter. In fact, the program counter is not stored in a register within the range addressable by an instruction; for example, the program counter is not stored in a pre-designated register within the registers depicted in FIG. 1B. Thus, implementing position independent code can be a challenge under such an architecture. In one approach according to the disclosure, instructions that perform PC-relative operations are encoded to reference a special-purpose register that is not used by correct user-mode code (and hence would generate an error). In MIPS® architecture, there are registers within the set of general purpose registers that are reserved for kernel mode software access (called $k0-$k1). These registers are not referenced by correctly executing user-mode code in current MIPS architecture processors. Thus, in one example architectural approach, one or both of these registers can be used as an alias for the program counter, such that when that register or registers is identified in an instruction, the processor instead uses a value of the program counter.

This approach allows a user-mode program to access a program counter value, while maintaining backwards compatibility with MIPS architecture binaries. It is typically expected that user mode programs access memory through a memory management unit, or by fixed address mappings (in simple embedded systems). A processor that implements the above-described architectural example still would be able to check permissions when a program attempts to load data from, or set a program counter to, a particular value, whether calculated relative to a current program counter or otherwise.

Branch with Compare and Effective Address Calculation

Figure 7:
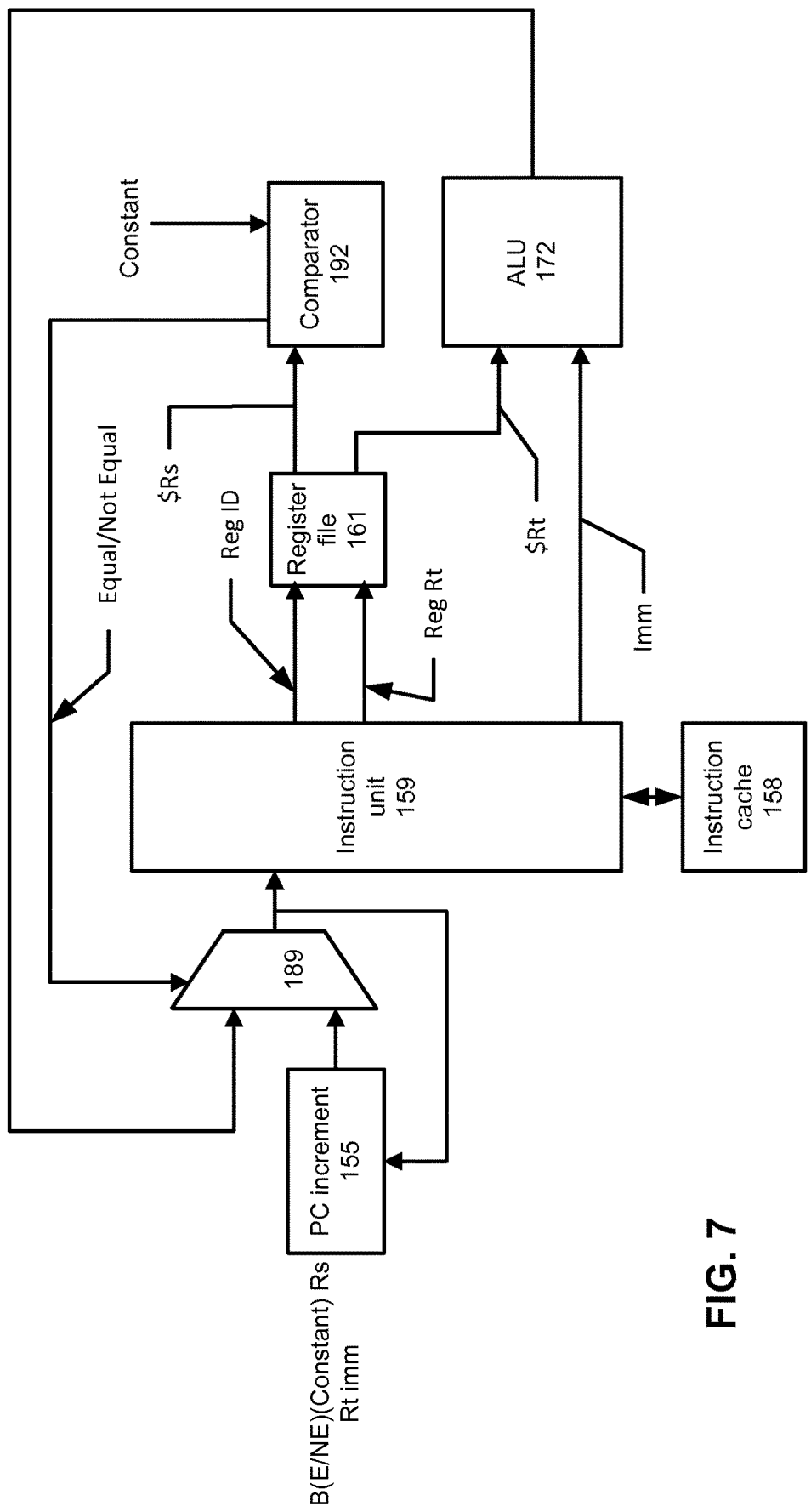
FIG. 7 depicts a functional block diagram for a processor implementing instructions according to the disclosure.

FIG. 7 depicts an example block diagram of how a processor can implement conditional branch instructions, where the branch target address is calculated both based on an immediate and based on contents of a specified general-purpose register. Specifically, FIG. 7 depicts an example of a branch conditioned on whether a value in a specified register is equal or not equal to a pre-determined constant (e.g., 0). Such form of instruction can be abbreviated as B(E/NE)(Constant) Rs, Rt, Imm, where the effective of such instructions are to branch to an effective address calculated from $Rt and Imm if $Rs is either equal (E) or not equal (NE) to a constant. In some implementations, the constant is fixed at zero and is not specifiable by the instruction, and instead, a different instruction is provided for each different constant, as desired.

Instruction unit 159 decodes the instruction and causes the value of both Rs and Rt to be retrieved from register file 161 (which may involve some intermediate scheduling operations). $Rs is the value to be compared in this example, and thus is provided to a comparator 192. The comparator also inputs a value of the constant. If the constant is 0, a register from the general purpose registers may be hardwired to store only 0, and the 0 may be sourced from that register. It is possible that different instructions may be provided to compare contents of a register with different constants (rather than specifying the constant as an immediate). Comparator 192 generates an equal/not equal signal that is fed back to a multiplexer 189, which selects between an output of a PC incrementer 155 and an output of ALU 172, which inputs the immediate value from the instruction, and $Rt, and produces a target address from these inputs. The depiction of PC incrementer 155 and multiplexer 189 is for sake of explanation and actual implementations of these disclosures may implement program counter determination logic in any number of ways. Also, branch target addresses can be cached or predicted, and such caching and prediction techniques can be used in the context of this process and other processes, as well as processors that implement such processes, in order to determine a branch or jump target address.

Additions with Branches on Overflow

Figure 8:
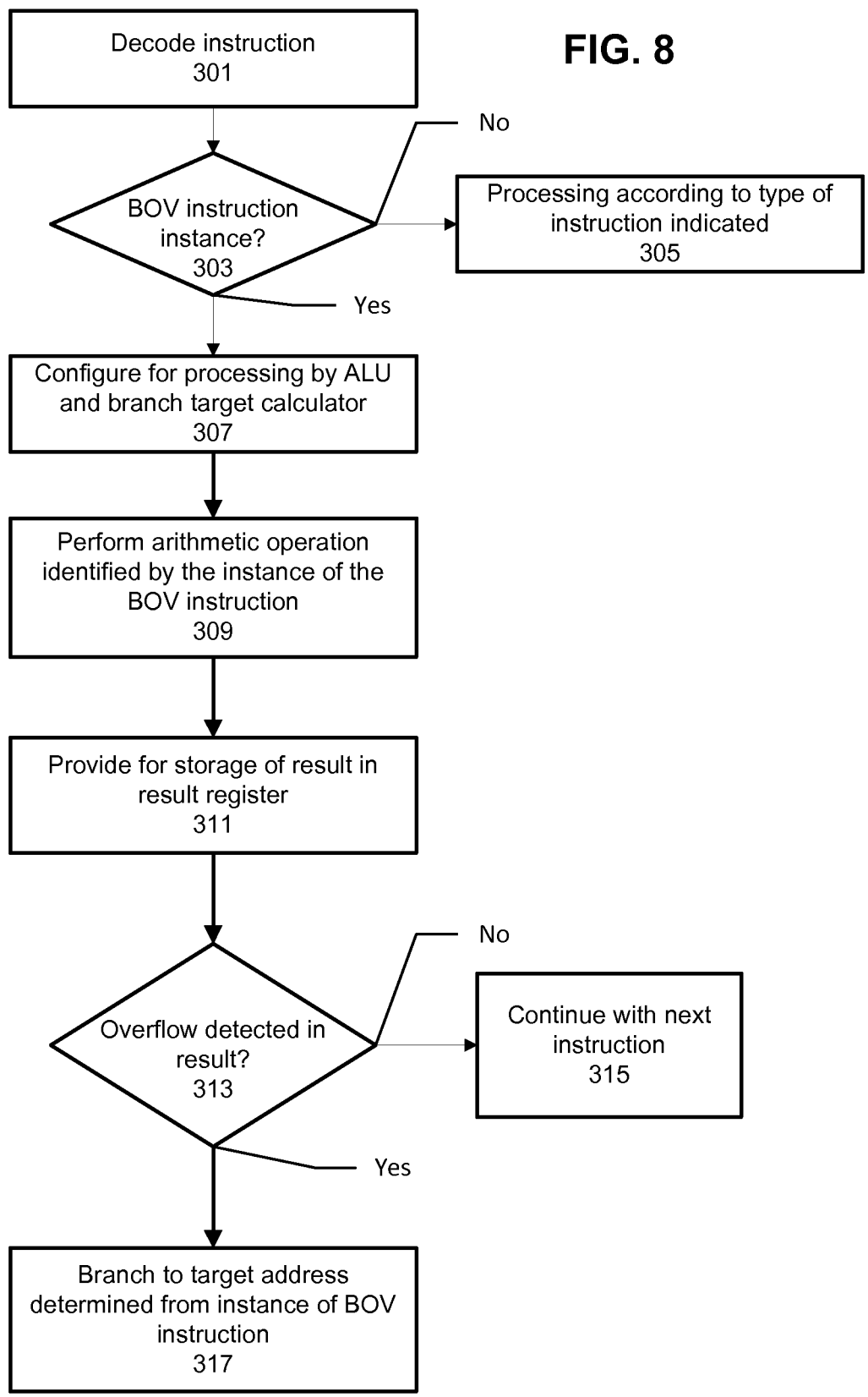
FIG. 8 depicts an example process implementable by a processor executing an add with branch on overflow instruction according to the disclosure.

FIGS. 8 and 9A and 9B disclose aspects of processor architecture implementations that implement additions (and/or subtractions), and then branch on overflow (and on underflow). For simplicity, overflow will be used to refer to both overflow and underflow here, and addition is exemplary of behavior of both addition and subtraction. FIG. 8 depicts a method (actions 301 to 317) that may be implemented by the functional flow depicted in FIG. 9A, where FIG. 9A depicts a specific example of BAVC Rs Rt Imm. At 301, an instruction is decoded by instruction unit 159, and if the instruction is an instance of a Branch on Overflow (BOV) instruction, then ALU 172 and branch target logic 199 is configured (at 307) accordingly. In an example, this configuration includes that a branch target is calculated using the program counter and the immediate value (Imm). Also, instruction unit 159 identifies Rs and Rt to register file 161, which provides $Rs and $Rt to ALU 172. In this example, ALU 172 adds $Rt and $Rs (309 in FIG. 8) and provides that value to be written to Rs (311 in FIG. 8). Also, ALU 172 checks for overflow while implementing the addition. As such, the addition is performed and a result is stored in an appropriate register, regardless whether there was overflow or not.

ALU 172 generates an overflow indication 255 that is provided to multiplexer 189, which selects between an output of PC incrementer 155 and branch target calculation logic 199, in dependence on presence of overflow (decision 313). In some implementations, branches on overflow may use branch target calculation logic used for instruction fetch. Branch target calculation logic may operate with predication. With predication, a branch prediction element (FIG. 1A, 60, for example) may predict a branch and effective address, and instruction unit 159 may fetch instructions at that effective address. Prediction also may be disabled for instructions that indicate arithmetic operations with branches on overflow.

In FIG. 8, at 315, if there was no overflow, then the program continues with a next instruction, and at 317, the program continues at the branch target address, if there was overflow. Implementations of these examples can take any of a variety of approaches to determining a next instruction for execution (incrementing) and for determining an instruction that will execute on branching. For example, program counters may be pre-incremented, such that the program counter already points to a next instruction. Some architectures may provide a branch delay slot, such that an add with branch on overflow may always execute the next instruction after the add with branch on overflow, even if branching is to occur. Add with branch on overflow can be implemented with instruction variations that provide a delay slot and those that do not. Other variations in these implementations would be apparent therefrom. As such, those of ordinary skill would understand that the disclosures do not imply any specific approach to tracking program progress, calculating a branch target address, and so forth.

FIG. 9B depicts an example of checking for overflow in ALU 172 on 32 bit boundaries. FIG. 9B depicts overflow detection logic 196a and 196b provided with adder circuitry that inputs 32 bit parts of 64 bit quantities to be added (where 194a and 194b are 32-bit parts of one 64 bit operand ($Rs or Rt), and 195a and 195b are 32-bit parts of the other operand to the addition). A logical OR 197 indicates overflow if overflow is detected at either 196*a* or 196*b*. Overflow can be detected for both signed and unsigned addition/subtraction. An instruction can specify an arithmetic operation to be performed using values contained in one or more registers, as well as a register containing a value that will be used to form a branch target address. Some implementations may identify two registers and an immediate, and branch target addresses are formed based on a program counter value. Some implementations may identify three registers and an immediate, where one register is used for an indirect addressing mode. These disclosed aspects can be used in connection with single instruction multiple data registers, such as SIMD within a register. Therefore, an instruction can identify one register, but that identification may be used to identify multiple components of a register, or to use a given register as multiple distinct components. Where a SIMD arithmetic instruction with overflow is provided, the branching can be conditioned in any number of approaches. For example, branching can be done responsive to any Boolean operation (such as AND, OR, XOR, NOR, XNOR, don't care on selected, and so on) on indications of whether any component of the SIMD operation overflowed.

Figure 10:
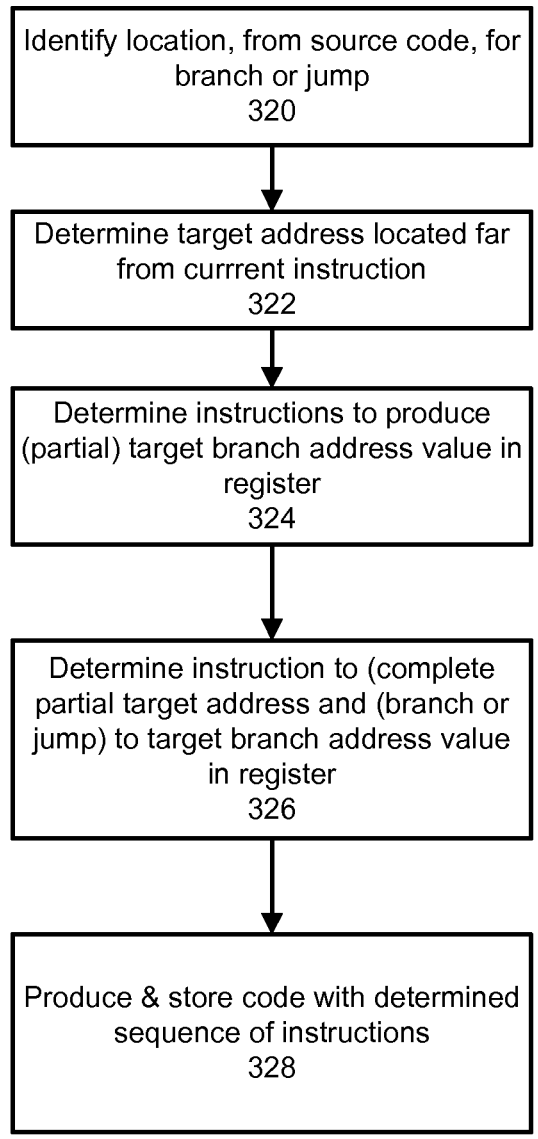
FIG. 10 depicts an example process of producing machine executable code having instructions according to the disclosure.

FIG. 10 depicts an example process of producing machine code from source code, in the specific example of a situation where a branch or jump needs to cross a large address space (which is a usage case for using the jump and branch instructions described relative to FIGS. 2-5. In particular, at 320, FIG. 10 depicts that a location in source code for a branch or jump can be identified. Then, at 322, a target address for the branch or jump is determined and found to be outside of a range that can be reached using a 16-bit offset from reference address (e.g., either a program counter or a base address) (which is called "far" in this context). At 324, instructions are determined to produce either an entire or a partial target branch address, e.g., an upper 48 bits of the target branch address can be determined. At 326, an instruction is determined that performs the change of control, and if only a part of the target branch address was computed, the instruction may complete the target branch address. The instructions determined at 324 and 326 can then be produced at 328, relatively arranged, and stored with other instructions in the sequence of instructions. This process is exemplary. Here, the target address may itself be expressed relative to another value. For example, where a just-in-time compilation process is performed, an actual location of a set of instructions (for branches or jumps) and/or data (for a load instruction) may be located in a portion of free memory that may have a variable relationship relative to the location of the instruction being executed. In other words, when a module is linked, relative addresses need to be replaced with values determined based on where the code for the module will be located in memory. In linking according to the disclosure, linking can be made easier by virtue of having much greater memory range address ability, with fewer instructions, and also to allow linking values to be made relative to a program counter. Thus, the particular actions taken in an implementation according to the example of FIG. 10 may vary depending on the context in which the process is performed.

A processor can be designed with a decode unit that implements these disclosures. The processor may operate under configuration by code generated from an external source (e.g., a compiler, an assembler, or an interpreter). Such code generation can include transforming source code in a high level programming language into object code (e.g., an executable binary or a library that can be dynamically linked), or producing assembly language output, which could be edited, and ultimately transformed into object code. Other situations may involve transforming source code into an intermediate code format (e.g., a "byte code" format) that can be translated or interpreted, such as by a Just In Time (JIT) process, such as in the context of a virtual machine that executes an interpreted language, such as Java® or a derivative, such as Android®. Any such example code generation aspect can be used in an implementation of the disclosure. Additionally, these examples can be used by those of ordinary skill in the art to understand how to apply these examples to different circumstances.

Figure 11:
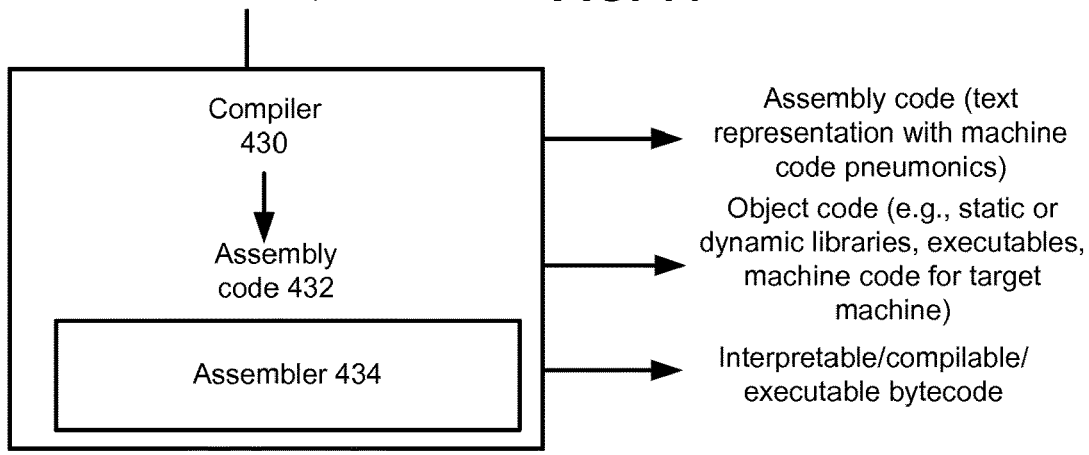
FIG. 11 depicts a' block diagram of a compiler that can produce assembly code, object code and code, such as bytecode that can be interpreted or compiled in a VM.

FIG. 11 depicts a diagram in which a compiler 430 includes an assembler 434. As an option, compiler 430 can generate assembly code 432 according to the disclosure. This assembly code could be outputted. Such assembly code may be in a text representation that includes pneumonics for the various instructions, as well as for the operands and other information used for the instruction. These pneumonics can be chosen so that the actual operation that will be executed for each assembly code element is represented by the pneumonic. In other words, even though underlying binary opcode identifiers within a binary code may be the same, when representing that binary code in text assembly language, the pneumonics selected would be selected also based on the other elements of each assembly language element, such as relative register ordering, that affect what operation will be performed by the processor and not simply a literal translation of the binary opcode identifier. FIG. 11 also depicts that compiler can output object code, and bytecode, which can be interpretable, compilable or executable on a particular architecture. Here, "bytecode" is used to identify any form of intermediate machine readable format, which in many cases is not targeted directly to a physical processor architecture, but to an architecture of a virtual machine, which ultimately performs such execution. A physical processor architecture can be designed to execute any such bytecode, however, and this disclosure makes no such restriction.

Figure 12:
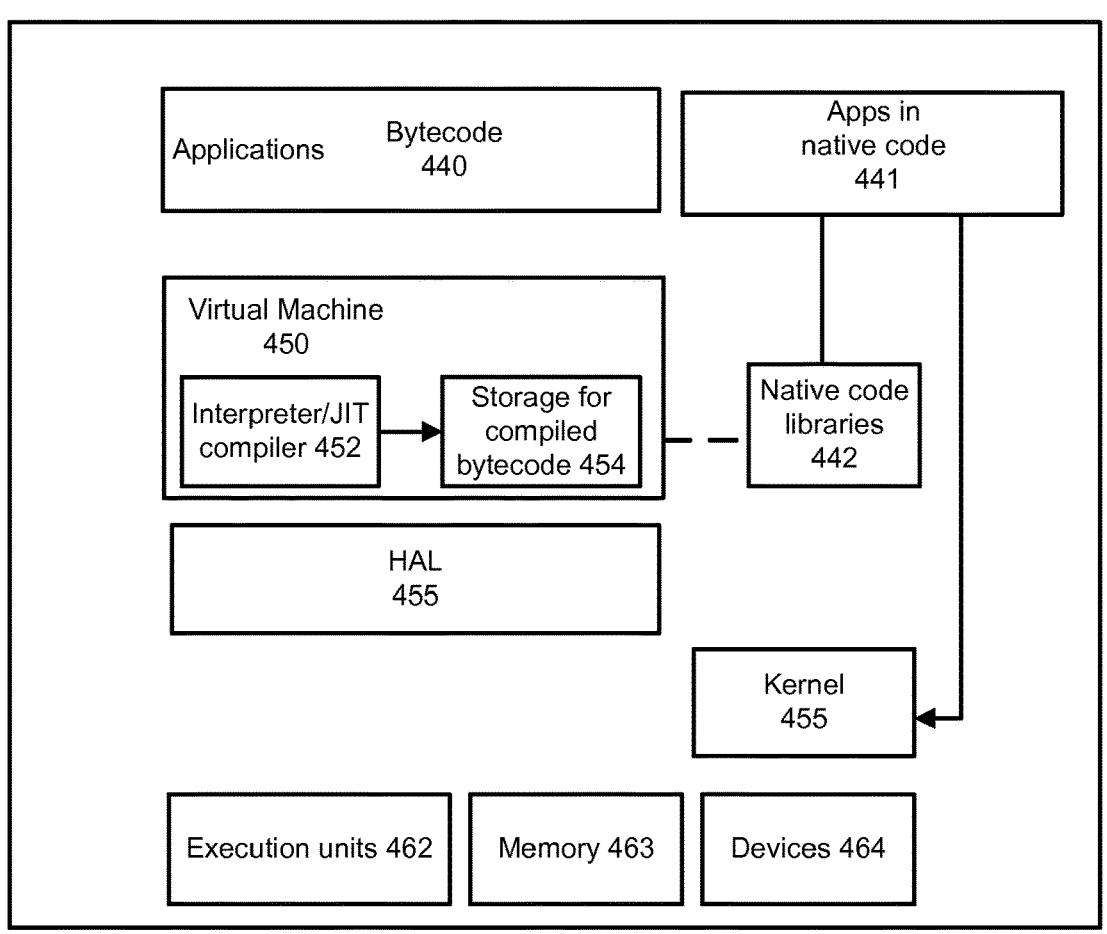
FIG. 12 depicts a software-oriented block diagram of a machine that implements a virtual machine that can execute bytecode, as well as executing applications in native code, and other code, on execution units.

FIG. 12 depicts a block diagram of an example machine 439 in which aspects of the disclosure may be employed. A set of applications are available to be executed on machine 439. These applications are encoded in bytecode 440. Applications also can be represented in native machine code; these applications are represented by applications 441. Applications encoded in bytecode are executed within virtual machine 450. Virtual machine 450 can include an interpreter and/or a Just In Time (JIT) compiler 452. Virtual machine 450 may maintain a store 454 of compiled bytecode, which can be reused for application execution. Virtual machine 450 may use libraries from native code libraries 442. These libraries are object code libraries that are compiled for physical execution units 462. A Hardware Abstraction Layer 455 provides abstracted interfaces to various different hardware elements, collectively identified as devices 464. HAL 455 can be executed in user mode. Machine 439 also executes an operating system kernel 455.

Devices 464 may include IO devices and sensors, which are to be made available for use by applications. For example, HAL 455 may provide an interface for a Global Positioning System, a compass, a gyroscope, an accelerometer, temperature sensors, network, short range communication resources, such as Bluetooth or Near Field Communication, an RFID subsystem, a camera, and so on.

Machine 439 has a set of execution units 462 which consume machine code which configures the execution units 462 to perform computation. Such machine code thus executes in order to execute applications originating as bytecode, as native code libraries, as object code from user applications, and code for kernel 455. Any of these different components of machine 439 can be implemented using the virtualized instruction encoding disclosures herein.

Figure 13:
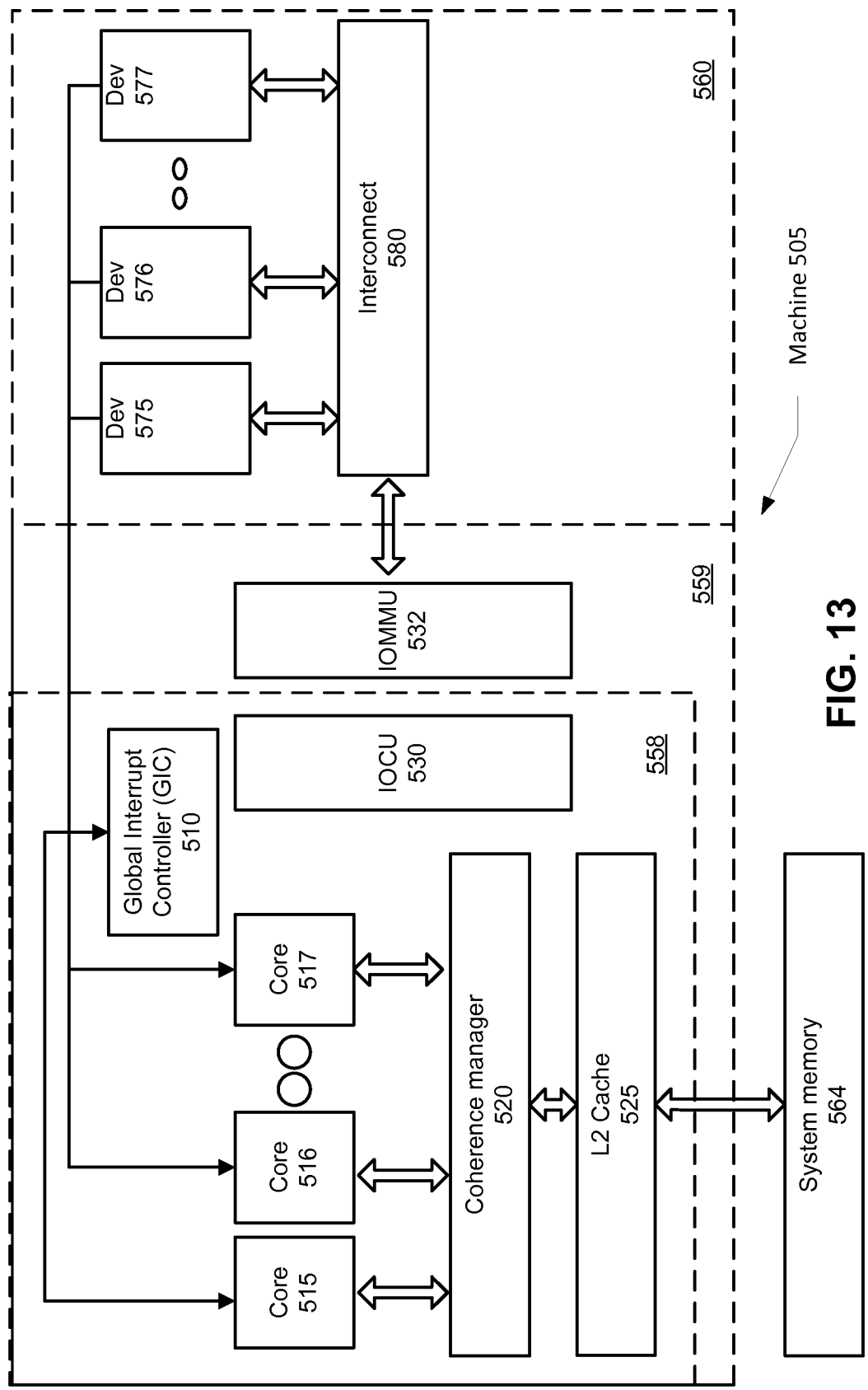
FIG. 13 depicts a block diagram of an example hardware-oriented block diagram of a machine that can implement aspects of the disclosure.

FIG. 13 depicts an example of a machine 505 that implements execution elements and other aspects disclosed herein. FIG. 13 depicts that different implementations of machine 505 can have different levels of integration. In one example, a single semiconductor element can implement a processor module 558, which includes cores 515-517, a coherence manager 520 that interfaces cores 515-517 with an L2 cache 525, an I/O controller unit 530 and an interrupt controller 510. A system memory 564 interfaces with L2 cache 525. Coherence manager 520 can include a memory management unit and operates to manage data coherency among data that is being operated on by cores 515-517. Cores may also have access to L1 caches that are not separately depicted. In another implementation, an IO Memory Management Unit (IOMMU) 532 is provided. IOMMU 532 may be provided on the same semiconductor element as the processor module 558, denoted as module 559. Module 559 also may interface with IO devices 575-577 through an interconnect 580. A collection of processor module 558, which is included in module 559, interconnect 580, and IO devices 575-577 can be formed on one or more semiconductor elements. In the example machine 505 of FIG. 13, cores 515-517 may each support one or more threads of computation, and may be architected according to the disclosures herein.

Modern general purpose processors regularly require in excess of two billion transistors to be implemented, while graphics processing units may have in excess of five billion transistors. Such transistor counts are likely to increase. Such processors have used these transistors to implement increasing complex operation reordering, prediction, more parallelism, larger memories (including more and bigger caches) and so on. As such, it becomes necessary to be able to describe or discuss technical subject matter concerning such processors, whether general purpose or application specific, at a level of detail appropriate to the technology being addressed. In general, a hierarchy of concepts is applied to allow those of ordinary skill to focus on details of the matter being addressed.

For example, high level features, such as what instructions a processor supports conveys architectural-level detail. When describing high-level technology, such as a programming model, such a level of abstraction is appropriate. Microarchitectural detail describes high level detail concerning an implementation of an architecture (even as the same microarchitecture may be able to execute different ISAs). Yet, microarchitectural detail typically describes different functional units and their interrelationship, such as how and when data moves among these different functional units. As such, referencing these units by their functionality is also an appropriate level of abstraction, rather than addressing implementations of these functional units, since each of these functional units may themselves comprise hundreds of thousands or millions of gates. When addressing some particular feature of these functional units, it may be appropriate to identify substituent functions of these units, and abstract those, while addressing in more detail the relevant part of that functional unit.

Eventually, a precise logical arrangement of the gates and interconnect (a netlist) implementing these functional units (in the context of the entire processor) can be specified. However, how such logical arrangement is physically realized in a particular chip (how that logic and interconnect is laid out in a particular design) still may differ in different process technology and for a variety of other reasons. Many of the details concerning producing netlists for functional units as well as actual layout are determined using design automation, proceeding from a high level logical description of the logic to be implemented (e.g., a "hardware description language").

The term "circuitry" does not imply a single electrically connected set of circuits. Circuitry may be fixed function, configurable, or programmable. In general, circuitry implementing a functional unit is more likely to be configurable, or may be more configurable, than circuitry implementing a specific portion of a functional unit. For example, an Arithmetic Logic Unit (ALU) of a processor may reuse the same portion of circuitry differently when performing different arithmetic or logic operations. As such, that portion of circuitry is effectively circuitry or part of circuitry for each different operation, when configured to perform or otherwise interconnected to perform each different operation. Such configuration may come from or be based on instructions, or microcode, for example.

In all these cases, describing portions of a processor in terms of its functionality conveys structure to a person of ordinary skill in the art. In the context of this disclosure, the term "unit" refers, in some implementations, to a class or group of circuitry that implements the functions or functions attributed to that unit. Such circuitry may implement additional functions, and so identification of circuitry performing one function does not mean that the same circuitry, or a portion thereof, cannot also perform other functions. In some circumstances, the functional unit may be identified, and then functional description of circuitry that performs a certain feature differently, or implements a new feature may be described. For example, a "decode unit" refers to circuitry implementing decoding of processor instructions. The description explicates that in some aspects, such decode unit, and hence circuitry implementing such decode unit, supports decoding of specified instruction types. Decoding of instructions differs across different architectures and microarchitectures, and the term makes no exclusion thereof, except for the explicit requirements of the claims. For example, different microarchitectures may implement instruction decoding and instruction scheduling somewhat differently, in accordance with design goals of that implementation. Similarly, there are situations in which structures have taken their names from the functions that they perform. For example, a "decoder" of program instructions, that behaves in a prescribed manner, describes structure supports that behavior. In some cases, the structure may have permanent physical differences or adaptations from decoders that do not support such behavior. However, such structure also may be produced by a temporary adaptation or configuration, such as one caused under program control, microcode, or other source of configuration.

Different approaches to design of circuitry exist, for example, circuitry may be synchronous or asynchronous with respect to a clock. Circuitry may be designed to be static or be dynamic. Different circuit design philosophies may be used to implement different functional units or parts thereof. Absent some context-specific basis, "circuitry" encompasses all such design approaches.

Although circuitry or functional units described herein may be most frequently implemented by electrical circuitry, and more particularly, by circuitry that primarily relies on a transistor implemented in a semiconductor as a primary switch element, this term is to be understood in relation to the technology being disclosed. For example, different physical processes may be used in circuitry implementing aspects of the disclosure, such as optical, nanotubes, microelectrical mechanical elements, quantum switches or memory storage, magnetoresistive logic elements, and so on. Although a choice of technology used to construct circuitry or functional units according to the technology may change over time, this choice is an implementation decision to be made in accordance with the then-current state of technology. This is exemplified by the transitions from using vacuum tubes as switching elements to using circuits with discrete transistors, to using integrated circuits, and advances in memory technologies, in that while there were many inventions in each of these areas, these inventions did not necessarily fundamentally change how computers fundamentally worked. For example, the use of stored programs having a sequence of instructions selected from an instruction set architecture was an important change from a computer that required physical rewiring to change the program, but subsequently, many advances were made to various functional units within such a stored-program computer.

In various parts of the disclosure, determining values relative to a program counter was disclosed. For example, some disclosed aspects relate to adding a quantity to a program counter value, or otherwise determining a target branch address. It would be understood that these disclosures include adding a quantity to another quantity determined from the program counter value (e.g., the program counter value incremented by a value indicative of an instruction size, such as 4, in a situation where instructions are 32 bits and memory is byte-addressable). As such, these disclosures are not to be interpreted to exclude implementations in which certain details may be varied according to specifics of the processor architecture or microarchitecture.

Although some subject matter may have been described in language specific to examples of structural features and/or method steps, it is to be understood that the subject matter defined in the appended claims is not necessarily limited to these described features or acts. For example, a given structural feature may be subsumed within another structural element, or such feature may be split among or distributed to distinct components. Similarly, an example portion of a process may be achieved as a by-product or concurrently with performance of another act or process, or may be performed as multiple separate acts in some implementations. As such, implementations according to this disclosure are not limited to those that have a 1:1 correspondence to the examples depicted and/or described.

Above, various examples of computing hardware and/or software programming were explained, as well as examples how such hardware/software can intercommunicate. These examples of hardware or hardware configured with software and such communications interfaces provide means for accomplishing the functions attributed to each of them. For example, a means for performing implementations of software processes described herein includes machine executable code used to configure a machine to perform such process. Some aspects of the disclosure pertain to processes carried out by limited configurability or fixed function circuits and in such situations, means for performing such processes include one or more of special purpose and limited-programmability hardware. Such hardware can be controlled or invoked by software executing on a general purpose computer.

Aspects of functions, and methods described and/or claimed may be implemented in a special purpose or general-purpose computer including computer hardware, as discussed in greater detail below. Such hardware, firmware and software can also be embodied on a video card or other external or internal computer system peripherals. Various functionality can be provided in customized FPGAs or ASICs or other configurable processors, while some functionality can be provided in a management or host processor. Such processing functionality may be used in personal computers, desktop computers, laptop computers, message processors, hand-held devices, multi-processor systems, microprocessor-based or programmable consumer electronics, game consoles, network PCs, minicomputers, mainframe computers, mobile telephones, PDAs, tablets and the like.

Aspects disclosed herein will generally exist in the context of larger systems and components of systems. For example, processing can be distributed over networks, such as local or wide area networks and may otherwise be implemented using peer to peer technologies and the like. Division of tasks can be determined based on a desired performance of the product or system, a desired price point, or some combination thereof. In embodiments implementing any of the described units at least partially in software, computer-executable instructions representing unit functionality can be stored on computer-readable media, such as, for example, magnetic or optical disks, flash memory, USB devices, or in networks of storage devices such as NAS or SAN equipment, and the like. Other pertinent information, such as data for processing can also be stored on such media.

In addition to hardware embodiments (e.g., within or coupled to a Central Processing Unit ("CPU"), microprocessor, microcontroller, digital signal processor, processor core, System on Chip ("SOC"), or any other programmable or electronic device), implementations may also be embodied in software (e.g., computer readable code, program code, instructions and/or data disposed in any form, such as source, object or machine language) disposed, for example, in a computer usable (e.g., readable) medium configured to store the software. Such software can enable, for example, the function, fabrication, modeling, simulation, description, and/or testing of the apparatus and methods described herein. For example, this can be accomplished through the use of general programming languages (e.g., C, C++), GDSII databases, hardware description languages (HDL) including Verilog HDL, VHDL, SystemC Register Transfer Level (RTL) and so on, or other available programs, databases, and/or circuit (i.e., schematic) capture tools. Embodiments can be disposed in computer usable medium including non-transitory memories such as memories using semiconductor, magnetic disk, optical disk, ferrous, resistive memory, and so on.

As specific examples, it is understood that implementations of disclosed apparatuses and methods may be implemented in a semiconductor intellectual property core, such as a microprocessor core, or a portion thereof, embodied in a Hardware Description Language (HDL)), that can be used to produce a specific integrated circuit implementation. A computer readable medium may embody or store such description language data, and thus constitute an article of manufacture. A non-transitory machine readable medium is an example of computer readable media. Examples of other embodiments include computer readable media storing Register Transfer Language (RTL) description that may be adapted for use in a specific architecture or microarchitecture implementation. Additionally, the apparatus and methods described herein may be embodied as a combination of hardware and software that configures or programs hardware.

Also, in some cases terminology has been used herein because it is considered to more reasonably convey salient points to a person of ordinary skill, but such terminology should not be considered to impliedly limit a range of implementations encompassed by disclosed examples and other aspects.

Also, a number of examples have been illustrated and described in the preceding disclosure. By necessity, not every example can illustrate every aspect, and the examples do not illustrate exclusive compositions of such aspects. Instead, aspects illustrated and described with respect to one figure or example can be used or combined with aspects illustrated and described with respect to other figures. As such, a person of ordinary skill would understand from these disclosures that the above disclosure is not limiting as to constituency of embodiments according to the claims, and rather the scope of the claims define the breadth and scope of inventive embodiments herein. The summary and abstract sections may set forth one or more but not all exemplary embodiments and aspects of the invention within the scope of the claims.

What is claimed is:

1. A processor comprising:
    an execution unit comprising an Arithmetic and Logic Unit (ALU) that is configured to accept at least two inputs, to perform an arithmetic operation on the accepted inputs, the arithmetic operation specified by an instruction from a program being executed, and to generate an indication of overflow, which indicates whether the arithmetic operation resulted in overflow, wherein the execution unit is configured to perform a multi-word sized addition, and to check for overflow at multiple boundaries within a multi-word result of the addition; and
    an instruction unit configured to receive the indication and to branch to a location in the program being executed, in response to the indication indicating that the arithmetic operation resulted in overflow,
    wherein the ALU includes a first overflow detection circuit and a second overflow detection circuit, wherein the first overflow detection circuit is configured to accept a first part of a first input and a first part of a second input, the second overflow detection circuit is configured to accept a second part of the first input and a second part of the second input, and the indication of overflow is generated as a function of a Boolean operation on the outputs of the first overflow detection circuit and the second overflow detection circuit.

2. The processor of claim 1, further comprising a program counter register holding a value of a program counter which identifies a location in the program, and the instruction unit is further configured to determine a subsequent instruction to execute, either as an increment based on the value of the program counter, in response to the indication indicating that the arithmetic operation did not result in overflow, or by calculating a branch target address, in response to the indication indicating that the arithmetic operation did overflow.

3. The processor of claim 2, wherein the instruction unit is configured to calculate the branch target address based on an immediate value specified by the instruction.

4. The processor of claim 2, wherein the instruction unit is configured to calculate the branch target address based on an immediate value and a value from a register specified by the instruction.

5. The processor of claim 1, wherein the instruction unit is configured to decode the instruction as identifying a first register holding one of two inputs and a second register holding the other of the two inputs, and an immediate.

6. The processor of claim 1, wherein the multi-word sized addition is a double-word sized addition, and overflow is checked at word boundaries in the multi-word result.

7. The processor of claim 1, wherein the execution unit is further configured to be controlled to subtract, as the arithmetic operation, one of the at least two inputs from another of the at least two inputs and to indicate overflow, in response to the subtraction resulting in underflow.

8. The processor of claim 1, wherein overflow is indicated for one of the following circumstances: (1) only positive overflow (2) only negative overflow (3) either positive or negative overflow.

9. A method of instruction-controlled execution in a microprocessor, comprising:
    decoding, in the microprocessor, an instruction into data identifying a first register, a second register, an immediate value, and an opcode identifier; and
    interpreting the opcode identifier as indicating that an arithmetic operation is to be performed using data from the first register and the second register, and that the microprocessor is to perform a change of control operation in response to the addition of the first register and the second register causing overflow, wherein the change of control operation is to a location in a program determined based on the immediate value,
    wherein interpreting that the microprocessor is to perform a change of control operation in response to the addition of the first register and the second register causing overflow includes providing a first part of data in the first register and a first part of data in the second register to a first overflow detection circuit, providing a second part of the data in the first register and a second part of the data in the second register to a second overflow detection circuit, and determining that the microprocessor is to perform a change of control operation as a function of a Boolean operation on the outputs of the first overflow detection circuit and the second overflow detection circuit;
    performing the arithmetic operation, generating a signal indicating whether or not the arithmetic operation overflowed, and responsive to the signal indicating overflow, updating a program counter to the location in the program determined based on the immediate value; and
    checking for overflow at multiple boundaries within a multi-word arithmetic operation.

10. The method of instruction-controlled execution in a microprocessor of claim 9, further comprising performing the arithmetic operation, generating a signal indicating whether or not the arithmetic operation overflowed, and responsive to the signal indicating overflow, updating a program counter to the location in the program determined based on the immediate value and a value from a register specified by the instruction.

11. The method of instruction-controlled execution in a microprocessor of claim 9, wherein the arithmetic operation is addition, and the signal indicates whether or not the addition overflowed.

12. The method of instruction-controlled execution in a microprocessor of claim 9, wherein the arithmetic operation is subtraction, and the signal indicates whether or not the subtraction underflowed.

13. The method of instruction-controlled execution in a microprocessor of claim 9, further comprising calculating a branch target address based on the immediate and a current program counter value and using the calculated branch target address to update the program counter, responsive to overflow.

14. The method of instruction-controlled execution in a microprocessor of claim 9, further comprising determining a branch target address from data stored in a buffer, and using the determined branch target address to update the program counter, responsive to overflow.

15. The method of instruction-controlled execution in a microprocessor of claim 9 wherein the determining that the microprocessor is to perform a change of control operation is performed as a function of a Boolean OR of the outputs of the first overflow detection circuit and the second overflow detection circuit.

16. The method of instruction-controlled execution in a microprocessor of claim 9 wherein the determining that the microprocessor is to perform a change of control operation is performed as a function of a Boolean AND of the outputs of the first overflow detection circuit and the second overflow detection circuit.

17. The method of instruction-controlled execution in a microprocessor of claim 9 wherein the determining that the microprocessor is to perform a change of control operation is performed as a function of a Boolean XOR of the outputs of the first overflow detection circuit and the second overflow detection circuit.

18. The method of instruction-controlled execution in a microprocessor of claim 9 wherein the determining that the microprocessor is to perform a change of control operation is performed as a function of a Boolean XNOR of the outputs of the first overflow detection circuit and the second overflow detection circuit.

\* \* \* \* \*